United States Patent [19]

Franz

[11] 3,980,419

[45] Sept. 14, 1976

[54] SHAPING HEAD APPARATUS FOR PRODUCING IMPROVED EDIBLE SHELLS

[76] Inventor: James N. Franz, 655 High St., Denver, Colo. 80218

[22] Filed: Aug. 26, 1974

[21] Appl. No.: 500,344

[52] U.S. Cl............................... 425/459; 425/418; 425/457
[51] Int. Cl.².......................................... A23L 1/216
[58] Field of Search.................... 425/418, 457, 459

[56] References Cited
UNITED STATES PATENTS

| | | | |
|---|---|---|---|
| 1,137,946 | 5/1915 | Baird | 425/418 X |
| 1,875,175 | 8/1932 | Michel | 425/418 |
| 2,624,296 | 1/1953 | Nuttall | 425/418 |
| 3,232,246 | 2/1966 | Nishkian | 425/418 X |

Primary Examiner—Francis S. Husar
Assistant Examiner—David S. Safran
Attorney, Agent, or Firm—Andrus, Sceales, Starke & Sawall

[57] ABSTRACT

A shell is formed from shredded potatoes placed in a perforated basket form which defines the basic outer configuration of the shell. An inner forming core is moved into the basket with relative rotation established between the basket and the core. The core is provided with one or more peripheral grooves which are especially shaped to develop a forming and shaping means which initiates movement of the shreds and distributes the shredded material within the space between the core and the perforated basket means. The shredded potatoes may be placed within the basket or fed thereto through the head. The shreds are formed with at least a partial curved outer surface. A perforated closure basket is secured telescoped into the shell for cooking. The assembly is cooked with the shell opening horizontally. The shredded potatoes are processed to remove moisture prior to forming thereof and the total process may be done by an automated line.

6 Claims, 26 Drawing Figures

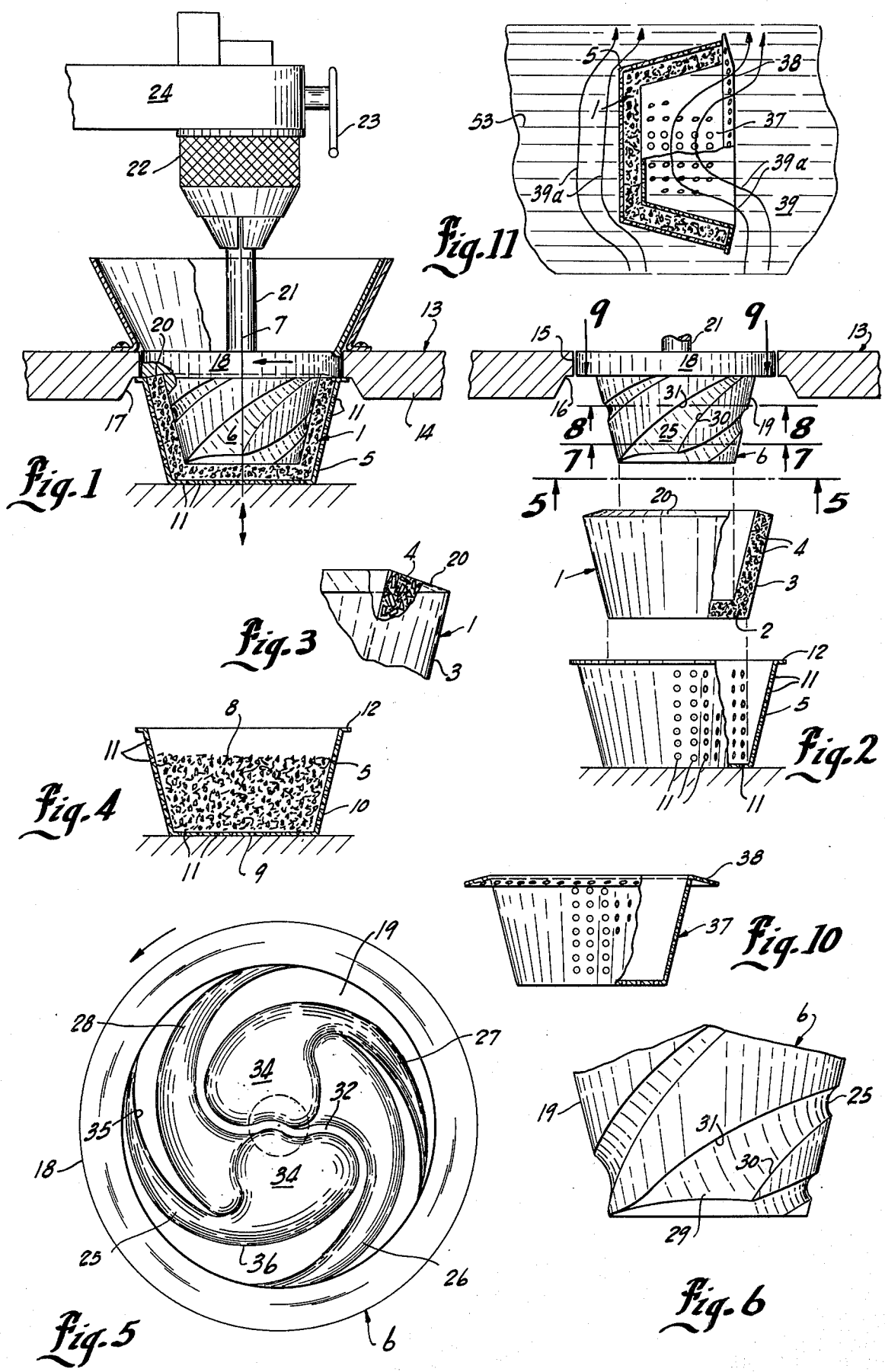

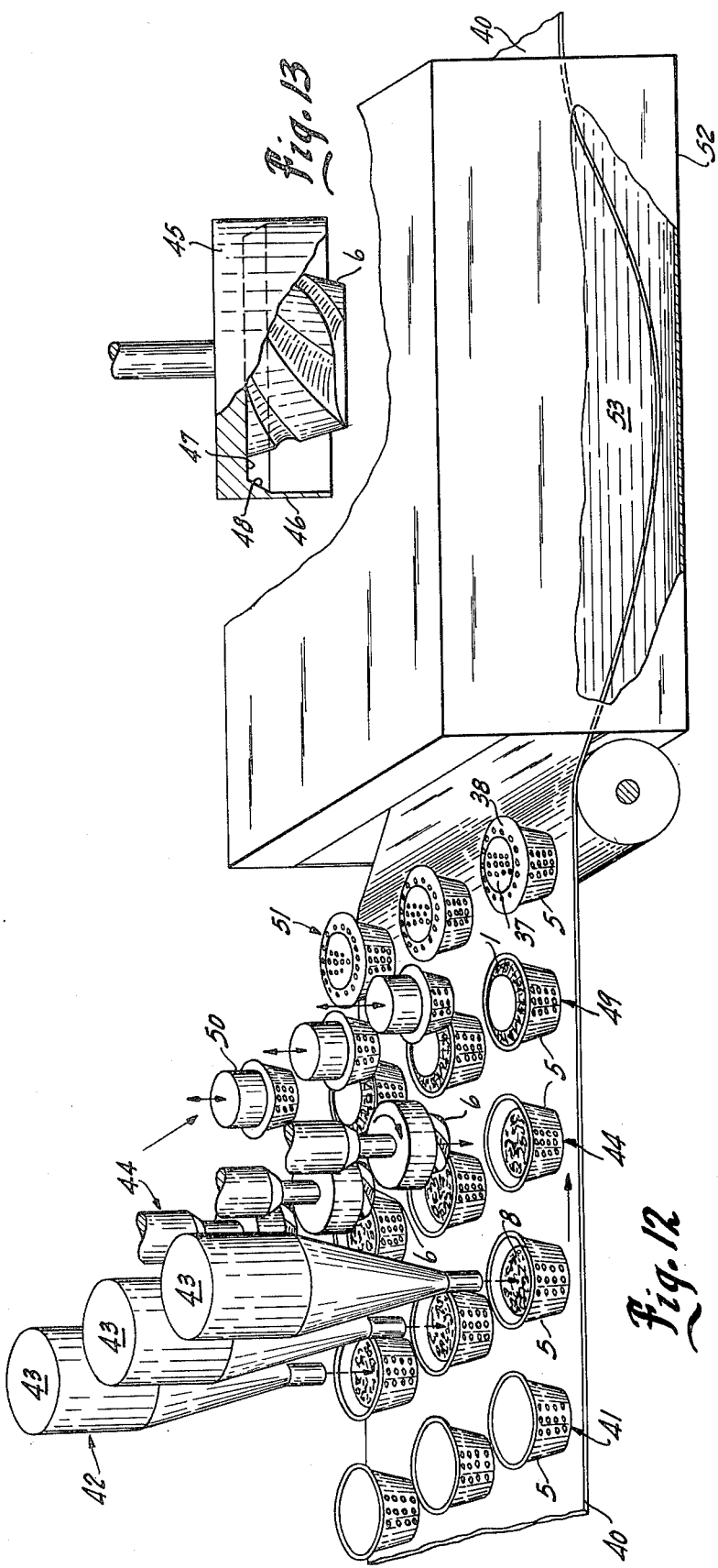
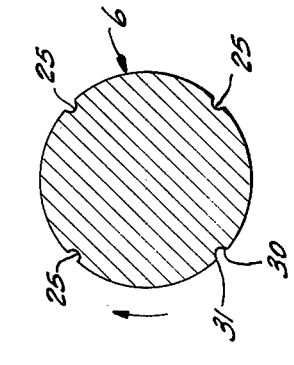
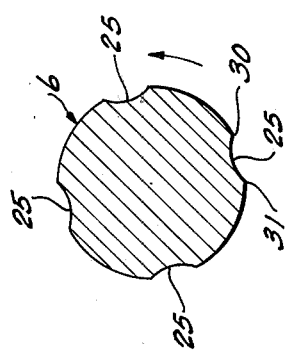
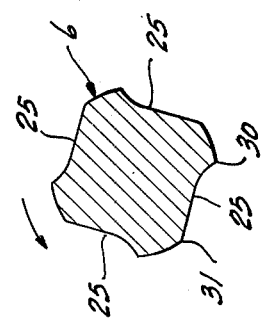

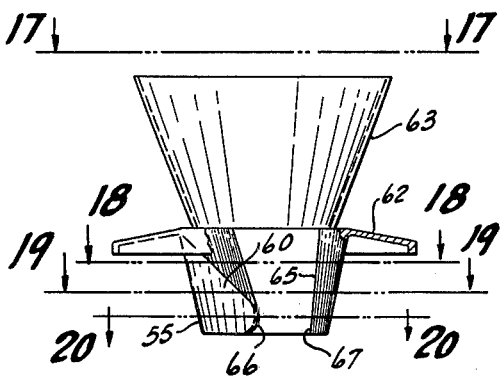
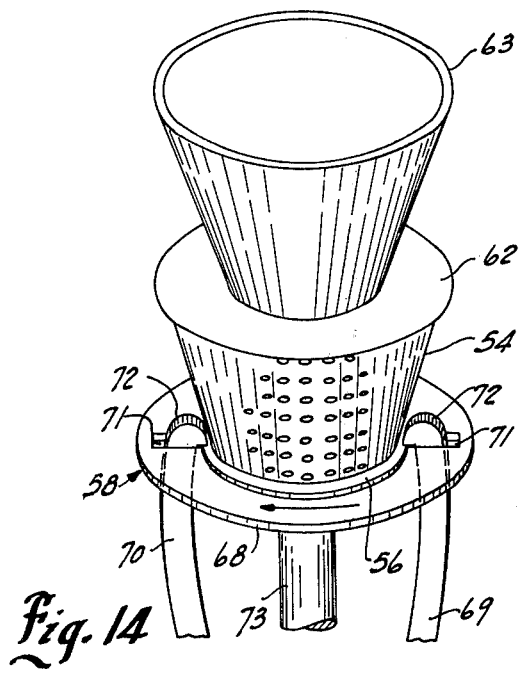
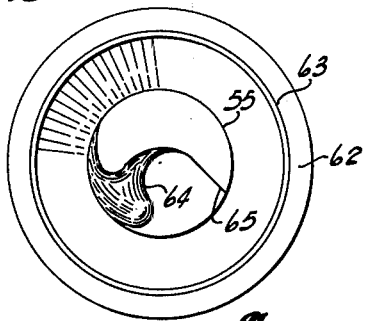
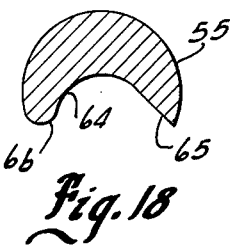
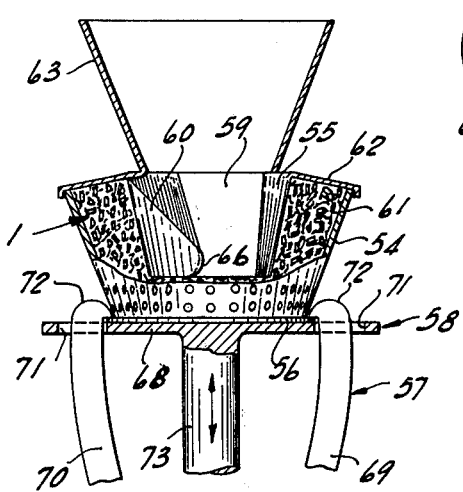
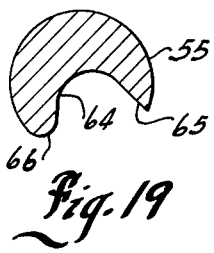
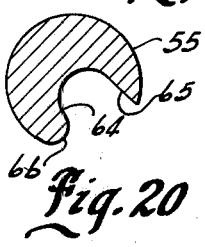

SHAPING HEAD APPARATUS FOR PRODUCING IMPROVED EDIBLE SHELLS

BACKGROUND OF THE INVENTION

This invention relates to an edible shell and to the method and apparatus for forming of such a shell.

Creamed and stew-like dishes are often served in or with formed potato or other dough products. A relatively recent product includes a cup-shaped potato container or shell within which individual servings of creamed dishes and the like are served. Generally, the potato shell is formed from a shredded or finely cut raw potato which is compressed within a perforated shaping basket and then deep fried to form the shell which is, subsequently, packaged and employed when it is desired to serve an appropriate dish. Such shells have been generally, essentially hand formed although various forming systems have been suggested. Hand processing is relatively time consuming with a corresponding significant expense.

SUMMARY OF THE PRESENT INVENTION

The present invention is particularly directed to an improved edible container which may be formed from potatoes and the like and particularly to a method and apparatus for automatic, mechanical forming of such a container. Generally, in accordance with the present invention, a basket means, which is preferably perforated, is provided defining the basic outer configuration of the container. An inner core means is adapted to be located within the basket and the mounting means provides for establishing relative rotation between the basket and the inner core means. The core means is provided with one or more peripheral cut-out portions or grooves which are especially shaped to develop a forming and shaping means which distributes the shredded material within the space between the core means and the perorated basket means. Thus, the shredded material may be placed in a premeasured manner within the basket and the core moved into the material or the core can be appropriately located with the material fed into the cut-out portion and thus fed into the position or the space between the basket and the forming core. Further, in accordance with the broadest aspects of the present invention, the relative rotation between the two can be provided by rotating either one or both of the basket and core means. The peripheral cut-out portion is formed with an inclined surface serving to shape and control the distribution of the shredded material throughout the depth of the basket and also controlling the density of the final shell. The rotating action also provides centrifugal forces acting on the product to further control the compacting and density characteristic.

After the shell has been appropriately formed within the perforated basket a similar inner perforated closure basket or member may be secured overlying and telescoped into the shell as a cover with the assembly clamped together for cooking of the basket such as by processing in a conventional fryer.

Further, Applicant has found that with the present invention the improved product is obtained by prespinning or otherwise processing of the shredded or formed raw material to significantly reduce the water content from that generally employed and thereby provide a fluffing characteristic prior to forming thereof. The material not only adequately is formed but produces a better frying characteristic. Thus, the removal of the water improves the workability of the material and decreases the necessary frying time. Further, the characteristic of the final shell is a somewhat lighter colored basket which is considered desirable for aesthetic and sales purposes. The lesser amount of water in the shell prior to frying increases the life of the frying oil and thereby contributes to an efficient production method.

Applicant has found that the present invention readily permits rapid production of food shells of uniform size and texture. The machine creation of the shells results in the uniform characteristic of the preformed shells which permits standardizing of the frying time and also permits decreasing of the actual frying time. The process significantly minimizes labor requirements without sacrificing and, in fact, producing improved edible shells.

More particularly, in accordance with a preferred novel construction of the present invention, a generally cup-shaped perforated basket is formed of a stainless steel or other suitable similar material as a continuous smooth member, and having a conically shaped sidewall secured to a bottom wall by a relatively smooth, curved juncture. The basket is adapted to be mounted within any suitable fixture. A forming core has a similar outer shaped configuration of a somewhat reduced size such that when telescoped into the basket the sidewalls are in generally uniform spaced relation. In accordance with a particular aspect of the present invention, the core can be formed with an upper closure flange adapted to project outwardly into overlying closing relationship with the basket. The periphery of the core is formed with one or more peripheral channels which extend throughout the axial length or depth of the core generally as spiral grooves. Applicant has found that various shaped grooves may be employed depending upon the method of feeding in the product and the rotation of the forming elements.

In an unusually practical and novel construction, the baskets are purified with the low moisture, fluffy, shredded potatoes and the spinning core is moved into the filled baskets. The core has an outer smooth surface essentially corresponding to a selected inner container shape with a plurality of narrow, shallow spiral grooves extending circumferentially oppositely of the direction of core rotation from a specially formed bottom wall which directs the fluffy product into the lower end of the grooves. For optimum distribution, the grooves have a decreasing width from bottom to top and the bottom is formed as a flat, shallow enlarged expansion of the entrance end with a trailing pickup wall portion adjacent to the trailing end of the entrance end. Applicant has found that the forming core permits rapid production of high quality food containers or shells by manually moving of the core into the supported shaping basket.

Further, the rotating core may be conveniently adapted to an automated, mass production line operation wherein a plurality of forming cores are mounted in aligned relation above a forming basket conveyor line on which series of aligned forming baskets are mounted. An automatic filler precedes the forming station and is provided with means to feed predetermined amounts of the fluffy, low moisture potato shreds to each forming basket. Immediately following the forming station, a retaining station may be provided to place a cup-shaped, perforated, inner retainer in each formed basket for passing through an oil frying bath. In an automated system, the forming core will preferably be formed with suitable upper guide wall means to properly locate the forming baskets relative to the core as the core moves into the forming basket.

In accordance with the teaching of this invention, the core may, of course, be formed with other grooved-type walls which will distribute the shredded potato or the like throughout the bottom and sides of the forming basket. For example, a rotating core has been employed with a single, large channel or cut-out portion through which the shredded potatoes were fed while rotating of the forming basket. The leading distributing edge or wall of the channels which tends to move into the material is especially constructed as an inclined compound curved wall to form a hill-like forming wall with a curved spiral forming edge. The material is fed into the channel and moves downwardly therethrough and outwardly to the limited spaced between the basket and the core with the distributing edge continuously acting to shape and force the material into a predetermined compacted density. By controlling the configuration of the distributing edge as well as the relative speed of rotation and the characteristic of the material the final characteristic of the basket is subjected to various forms. The bottom edge of the channel wall generally extends to approximately the center of the core and functions to introduce and fill the bottom portion of the basket and to maintain a firm continuous basket.

Generally, Applicant has found that where the basket is rotated, a single channel core with the shreds fed into the top of the groove is preferably employed whereas where the core is rotated, a multiple channel core is employed.

Thus, a similar three channel rotating core has been employed to simultaneously feed the shredded material to the basket and to form the shell wall. In the three channel unit, each channel had a lower forming edge to ensure filling of the shell base as well as the compound feeding wall and forming edge to define and compact the shell sidewall.

The various embodiments and features of the present invention all provide a highly improved machine formed shell. Generally, optimum results have been obtained with the multiple, narrow-channel rotating forming core which repeatably forms high quality shells at a rapid rate.

The present invention thus provides a means of rapidly producing high quality edible shells of particulate potatoes and the like.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiments.

In the drawings:

FIG. 1 is a side elevational view of a basket forming apparatus with parts broken away to more clearly show the embodiment of the present invention;

FIG. 2 is an exploded view of the supporting basket and the forming core shown in FIG. 1 with the formed shell;

FIG. 3 is an enlarged fragmentary view of the formed potato shell;

FIG. 4 is a vertical cross section through a forming basket filled with a premeasured amount of shredded potatoes;

FIG. 5 is a bottom view of the forming core taken generally on line 5—5 of FIG. 3;

FIG. 6 is an enlarged, fragmentary view of the lower portion of the forming core;

FIGS. 7 – 9, inclusive, are cross sectional views taken generally on corresponding sections lines of FIG. 3 to more clearly illustrate the detail of the forming core of FIGS. 1 and 3.

FIG. 10 is a side elevational view of a cooking cover;

FIG. 11 is a view of the cover of FIG. 10 positioned within a formed shell for cooking;

FIG. 12 is a pictorial view of an automated processing line with parts broken away and sectioned to show details of construction;

FIG. 13 is a view illustrating an alternate embodiment of a forming head for an automated line;

FIG. 14 is a pictorial view of an alternate embodiment employing a stationary core and a rotating forming basket;

FIG. 15 is a vertical section through the apparatus of FIG. 14;

FIG. 16 is an elevation view of the forming core of FIGS. 14 and 15;

FIG. 17 is a plan view taken generally on line 17—17 of FIG. 16;

FIGS. 18 – 20, inclusive, are a sectional view generally on corresponding section lines of FIG. 16 and illustrating the cross section of the forming core of the alternate embodiment;

DESCRIPTION OF THE ILLUSTRATED EMBODIMENT

Figure 21:
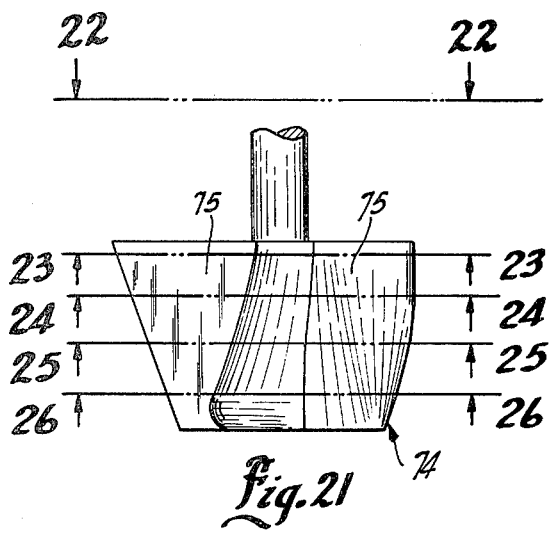
FIG. 21 is a view similar to FIG. 16 illustrating still a further embodiment of the invention.

Referring to the drawings and particularly to FIGS. 1 – 3, the present invention as illustrated is adapted to form a molded, edible, cup-shaped shell 1 having a relatively planar base 2 and a conically shaped sidewall 3. The shell 1 is formed of a plurality of interconnected individual edible strips or shreds 4 and has been particularly applied to forming of a potato shell by interconnecting of finely divided raw potatoes by shaping of the basket and deep frying thereof. The present invention is thus particularly described in connection with the particular process and apparatus for forming of shredded potatoes into a shell such as shown in FIG. 1.

Generally, in accordance with the present invention, the shell 1 is especially formed within a confining forming apertured basket 5 in cooperation with an especially formed shaping core 6 which moves into the basket 5 and distributes the shredded potatoes against the shaping basket for subsequent frying. The basket and core rotate relative to each other around the common axis 7 and in the embodiment of the invention illustrated in FIGS. 1–6. The core 6 rotates relative to the basket 5. In the embodiment of FIGS. 1–6, the core 6 rotates and moves into and from the basket 5 which is filled with a predetermined amount of shredded potatoes 8, as shown in FIG. 4.

More particularly, in the illustrated embodiment of the invention the forming or shaping basket 5 is formed with a generally planar base 9 and an upwardly conical sidewall 10 connected to the base by a relatively smooth juncture portion. The basket 5 is preferably formed of a stainless steel or other like metal particularly adapted for processing of edible food and is provided with a very substantial number of closely adjacent perforations 11 to permit the use of the basket 5 for deep frying of shell 1. The upper end of the basket 5 is provided with a flat, locating flange 12 which cooperates with a fixture 13 for locating of the prefilled basket 5 with respect to the core 6.

The fixture 13 generally includes a plate-like bed 14 having an opening 15 generally corresponding to the top opening of the basket 5. The lower portion of the bed opening is enlarged to define a locating ledge 16 of a diameter generally corresponding to the basket flange 12. With the basket 5 positioned within the bottom of opening 14 the flange 12 abuts ledge 16 and coaxially aligns the basket 5 with the core 6, which is mounted above the bed 14. The lower portion of the opening 15 is formed with a conical sidewall 17 for convenient manual placement and holding of the prefilled basket 5 in proper position within the fixture 13.

The head or core 6 is generally a frustroconically shaped element having a configuration corresponding to the shape of the basket 5 but smaller such that with the core 6 located within the basket 5, the base and sidewall are spaced from basket 5 by the desired thickness of shell 1.

The core 6 includes an upper cylindrical head 18 integrally formed with core 6. The head 18 has a diameter corresponding to the upper portion of opening 15. The lower face or surface 19 of head 18 defines an extension from the upper edge of the core 6 which is slightly conically shaped such that the walls extend outwardly and slightly downwardly with the outer edge aligned with the top edge opening of the basket 5.

In the completely telescoped position, the face 19 defines the upper confining wall for the compacted potatoes forming shell 1, such that the final upper shell edge 20 is slightly tapered.

Head 18 is secured for vertical positioning in a rotating support shown as generally conventional drill press assembly. Thus, a shaft 21 projects upwardly from head 18 coaxially of the opening 15 in the bed 14. A press chuck 22 is releasably and firmly affixed to the shaft 21 and is adapted to rotate the head 18 and interconnected core 6 while vertically positioning thereof. The press assembly is shown provided with a manually operable handle 23 for raising and lowering of the head 18, or a suitable automatic means such as a cylinder unit with a suitable manual input. The rotational drive may be imparted through any suitable drive means such as a motor-reducer gear unit 24, selected to produce the desired rotational speed of the core 6, which is specially constructed to distribute the premeasured potatoes 8 in basket 5 as the core 6 is lowered into the basket 5.

The core 6 of the first embodiment, in particular, includes a plurality of generally spiral type grooves shown as four spaced grooves 25, 26, 27 and 28 formed in the outer side surface of a solid frusto-conical shaped body which otherwise defines an outer surface essentially corresponding to the inner wall shape of the completed shell 1. The bottom surface of the core 6 is further specially shaped to form a smooth extension of the grooves 25 to promote the even distribution of the potatoes 8 within basket 5.

Each pair of diametrically opposed grooves 25 and 27, and 26 and 28, is generally similarly constructed and all grooves progressively becomes smaller as the groove extends from the lower end to the upper end. Referring particularly to grooves 26 and 27, as shown in FIGS. 1, 5, 6 and 7 includes a lower enlarged entrance portion 29 from which the grooves extend circumferentially upwardly with a progressively reduced width. The cross-section of the illustrated grooves 26 and 27 varies gradually as most clearly shown in FIGS. 7, 8 and 9. The lower most end of the grooves is preferably formed with a relatively shallow, long and generally flat entrance to a reasonably steep trailer wall 30, as shown in FIG. 7, to pick up the shreds and feed them into the groove. As the groove progresses upward it becomes more and more symmetrical as shown in FIGS. 8 and 9. The groove 26 extends throughout approximately one-fourth the core circumference and the trailing edge portion 30 dropping off slightly more rapidly than the leading edge 31 to the bottom wall extensions of the grooves and terminates above the bottom wall as shown in FIG. 6. This has been found to also contribute to a smooth, reliable distribution of the potatoes shreds within the particular grooved construction.

In particular, the bottom wall of core 6 is shaped from the center outwardly and then curves circumferentially into a smooth continuation of the trailing edge 30. The wall 32 is preferably curved with a generally S-shape to promote feeding of shreds into the center of the base and lower surface of the wall 32 generally defines a planar or flat surface to form the upper surface of the shell 1 during the rotation of the core 6. The leading surface portion of bottom surface from wall 32 to the next adjacent wall portion is generally slightly concave such that wall and concave surface move the adjacent potatoes 8 into the groove 26 as the rotating core 6 moves downwardly into the prefilled basket 5. In the illustrated embodiment of the invention, the one pair of walls 32 for diametrically opposite grooves 26 and 28 are aligned and formed with a coplanar lower, distinct, flat surface. The second diametrically opposite grooves 25 and 27 are generally similarly formed but the bottom wall is relieved slightly such that its shred portion is spaced slightly upwardly and the bottom wall portion merges smooth as continuous curved surfaces into the leading portion of the adjacent trailing grooves 26 and 28, as shown in FIGS. 5 and 6. Further, the bottom walls for grooves 25 and 27 are generally concave shaped as at 34 with the inner and outer portions 35 and 36 generally radially aligned. Thus each wall curves rearwardly and then forwardly to the trailing edge of the corresponding grooves 25 and 27. The illustrated embodiment has been found to provide a highly satisfactory mechanically forming apparatus. Generally, the relating motion of core and basket places the shreds into motion and then distributes them without mating of the potatoes. The precise shape and size as well as the number of grooves is not critical, however, to the satisfactory function of the present invention and the groove construction may vary significantly. Thus, the feeding is dependent upon not only the particular grooving but also on the speed of rotation of the core and the relative speed of moving the core into the potatoes. Thus, if the core is rapidly moved into the shredded potatoes 8, the potatoes may be mashed together before they can move upwardly through the grooved head. Although such a formed shell might be usable, uniform cooking cannot be practically provided and the product would not have the desired uniform appearance which can of course be important in marketing of the product. Generally, applicant has found that a flat groove feeds more slowly and the entrance therefore is elongated to allow adequate clearance of space for the shreds to move into the grooves and to properly form the lower or base portion of shell 1.

After the shell 1 has been formed, the basket 5 and formed shell 1 are removed, and a holding cup 37 is secured within the shell, as shown in FIGS. 10 and 11. The cup 37 is a perforated, metal member essentially corresponding to the inner configuration of the shell 1 and having an edge flange 38 which extends outwardly over the shell 1 and flange 12 of basket 5 to confine the shell 1. The subassembly of FIG. 11 is then deep fried to finish the shell 1.

As shown in FIG. 11, applicant has further found that the cooking is improved by placing the units in the oil 39 with the baskets opening laterally or sideways. The hot oil then tends to flow over the complete basket assembly as diagrammatically shown at 39a. This produces a more even and complete cooking of the shell 1 than is obtained with the assembly placed in the oil with the shell opening upwardly.

In carrying out of the present invention, applicant has found that superior results are obtained by reducing the moisture content of the shredded potatoes 8 in the basket 5 prior to forming. Generally, it has been considered essentially to not wash the shreds in order to retain the starches and the like to properly fly and bind the shreds into a proper self-supporting shell. Applicant has found that although this remains desirable and in carrying out the invention, all washing is of the potato, nevertheless, the shreds are prior to forming treated as by spinning within a suitable basket to remove the moisture and to produce a reasonably dry, fluffy type shred. This step is not essential to the use of the novel forming head teaching but in combination producing a very practical system of repeatably forming shells of uniform shape and texture. Applicant has found that further improvement in the final shell results if the shreds are formed with the outer surface portions at least partially including curved surfaces. Practically, the potatoes may be diced into one inch squares which are approximately one-quarter inch thick and the individual squares passed through a shredder plate having offset outwardly curved portions defining half-cone projecting cutters. The appartus or method employed is not of course particularly significant and no further discription or illustration is given. For example, potatoes of a conventional variety such as Idaho potatoes were sliced and shredded into shreds of approximately ¼ to 1 inch in length and with a curved outer surface portion. The shredded potatoes placed in a basket which was rapidly revolved to further treat and remove the moisture. The weight of the treated potatoes 8 were approximately 22 percent less after removal of the moisture content. The treated shredded potatoes are drier and reasonably fluffy and may readily be formed within the basket 5. The treated potatoes 8 were placed into the forming basket 5 which was then located within the opening 15. The core 6 has been rotated at approximately 600 to 800 rpm although significantly different speeds may be employed, the core 6 while rotating is rapidly lowered into the basket 5 by manual operation of the handle 23. The shell 1 was formed in approximately one second after which the core was raised and the basket 5 with the formed shell was removed from the opening 15. A plurality of the shells 1 are formed and retained within the individual baskets and covered with lids 37 for subsequent deep frying in oil. Thus, a plurality of the formed units may be placed in a rack, not shown, which is lowered into a suitable heated oil bath for cooking or frying of the shredded potatoes, resulting in a self-supporting shell 1. Applicant has found that the removal of the water significantly improves the workability of the shreds in the forming apparatus. After forming of the shell 1 and the introduction of the holding cover 37, shell 1 was deep fried for approximately three minutes and then removed as a completed shell 1. The shells 1 of this invention can be fried consistently at a standardized frying time and for a period less than that normally employed with conventional wet shreds from which the excess water was not removed. The automatic forming apparatus of the present invention generates a good distribution of the shreds to form a uniform size and texture within the shell 1 such that the successive shells similarly respond to the cooking.

Further, with the present invention there is less contamination of the frying oil. As the shell 1 is totally enclosed, flakes of the potatoes will not be left in the oil. The minimum moisture content of the potatoes of shell 1 also reduces the breaking down of the oil. The increased oil life contributes to a further economy in manufacture. The fried shells 1 of this invention also exhibit a consistent removal of frying oil after removal from the bath with a consequent increased shelf life in the final products. Finally, the character of the cooked or fried shell 1 is a relatively light brown color as contrasted to the relatively dark brown basket obtained with the conventional process. This is considered to provide an improved product from the standpoint of saleability.

The present invention permits the relative rapid formation of an improved and stable potato shell and the like at relatively low cost.

The present invention is particularly adapted to a production line system such as diagrammatically shown in FIG. 12 wherein a plurality of stations provide for sequential processing of the shells 1. In the illustrated embodiment, a suitable endless conveyor 40 supports longitudinal spaced rows 41 of baskets 5 which first move through a loading station 42. A plurality of hopper-type dispensers 43 are laterally spaced across the conveyor 40 in accordance with the lateral spacing of the baskets 5 in each row 41. The dispenser 43 receives the water-removal treated shreds, or includes means to so remove the excess water, and are operated in timed relation to the conveyor 40 to provide a premeasured quantity of the fluffy, shredded potatoes 8 to the aligned baskets 5. Thus, the conveyor 40 may operate in a stepped manner to hold the baskets in each station during the processing and then stepped to the next station.

Any suitable drive and control means may be employed and readily provided depending upon the particular component employed at each station. Consequently, a particular control is not shown or described other than to clearly explain the sequential forming and processing of the shells to a final product.

From the loading station 42, the row of filled baskets 5 are moved to a forming station 44 having individual forming cores 6, generally as shown in FIGS. 1–6, spaced in accordance with the baskets 5. In the embodiment of FIG. 12, each core 6 is preferably formed with a modified head 45 which incorporates an outer depending flange 46, as shown in FIG 13. As the core is lowered, the flange 46 telescopes over the basket 5. The inner wall is stepped, as at 47, with an inclined locating wall 48 similar to the bed 14 of the first embodiment to locate the basket 5 with respect to the forming core 6. After forming, the basket units move to a cover applying station 49 shown as an overlying applicator 50. The covers 37 are secured in inverted relation to the applicator 50 spaced in accordance with the baskets 5. As the basket covers 37 move to the lower conveyor fryer 51, the covers 37 are aligned with an incoming row of formed shell basket units. At an appropriate time, the covers 37 are released and move into the filled baskets 5 to form units as shown in FIG. 11.

The conveyor 40 continues from the cover station 49 to a cooking station 52 which includes a suitable oil bath 53. The conveyor 40 may gradually drop down into and through the oil 53 and then move upwardly to remove the thoroughly cooked shells 1. The excess oil rapidly drains from the apertured basket units which, when cooled, are opened, the completed shells 1 removed for subsequent packaging. The baskets and covers are, of course, reused for forming of further shells.

The fluffy, shredded potatoes and minimal cooking time requirements particularly adapt the shells of the invention to production line processing.

As previously noted, the present invention may employ various grooved configurations of the shaping cores and the relative rotation of core and basket may be created by simultaneous rotation of both elements or the basket may be rotated with a stationary core, as shown in the following embodiment.

Referring particularly to FIGS. 14–20, an alternative embodiment is shown wherein a perforated basket 54 is mounted to rotate relative to a relatively fixed core 55. The basket 54 is generally similar to the basket 5 but has a base flange 56 releasably secured within a rotating fixture 57 which is adapted to rotate relative to the core. The fixture 57 also reciprocates relative to the core 55, which is provided with a fixed mount 58, for the selective insertion and removal of the basket.

In this embodiment, the shredded material is fed downwardly through the core 55 into the basket 54 with basket rotation providing the desired basket formation.

The core 55 is especially constructed with a single peripheral cut-out portion or groove 59 with the leading edge 60 relative to the moving basket 54 defining means for distributing of the shredded potatoes 61 between the core 55 and the basket 54 to form the sidewall and base of the shell 1. The fixture 57 is withdrawn or lowered to seprate the form-filled basket 54 from the core 55. The basket with the formed shell is then removed from the fixture, assembled with a perforated cover, as in the first embodiment, for subsequent deep frying.

The core 55 is shown with an outwardly and downwardly inclined flange 62 which serves to confine the shredded potatoes 61 and prevents the potatoes from being forced upwardly and outwardly between the sidewalls of the basket 54 and the core 55.

The core 55 further includes a filling chute 63 extending upwardly from the groove 59. In accordance with the present invention, the leading wall portion 64 of the groove 59 is a relatively large, slowly curved wall which extends circumferentially and radially inwardly to a trailing flat wall, as most clearly shown in FIG. 17 and the sectional view of FIGS. 18 through 20. The groove 59 thus has a relatively wide, shallow peripheral opening adjacent the upper end of the core 55, as shown in FIG. 18.

The peripheral opening extent is a maximum at the top with the central portions spaced slightly offset from the center of the core 55 to span slightly less than one-half of the core.

The top portion of the leading wall 64 also projects downwardly at a relatively sharp incline or slope with a decreasing slope such that the radius of the cross-section of the leading wall 64 decreases as the wall approaches the lower end of the core 55, as shown in FIGS. 19 and 20. The lower portion of the forming wall 64 is curved backwardly adjacent to the undersurface of the core 55 as at 66 to provide a reverse section tendng to direct the shredded material smoothly into the area between the undersurface of the core and the base of the rotating forming basket. The trailing wall portion 65 projects outwardly to define the relatively flat wall. The lower end of the trailing edge is also provided with a curved portion including a slight reverse incline opposite that of wall 64 as at 67 as most clearly shown in FIG. 16 to promote a continuous smooth transfer of the shredded material. The configuration of the trailing wall is not particularly significant and does not contribute to the action in the same manner as the leading forming wall. In the single grooved core, the trailing bottom edge extends completely from the outer periphery into the center to provide a continuous smooth filling to the center of the shell.

The forming edge 60 is formed with the compound curvature as viewed in FIG. 16. The edge 60 is further a rounded edge which with the curvature provides proper feeding and forming of the shredded potatoes 61 into the space between the walls of the basket 54 and the core 55 with the shell of a predetermined thickness and density.

Although the forming wall can be readily formed to the desired configuration with minimal experimentation, applicant has found in forming of a potato shell such as previously described that the groove is desirable as shown in the drawings, with the inclined surface at the curved portion varying adjacent to the reverse curved wall portion 66 and reversing with the outer circumferential portion spaced slightly upwardly from the bottom. The example is merely given for purposes of explanation as the construction can vary widely.

The supporting basket fixtures 57 is illustrated as including a base plate 68 on which the basket 54 rests. A pair of clamping hook arms 69 and 70 extend upwardly through appropriate slots 71 in the plate 68. The arms are pivotally mounted and are adapted to be moved with upper hook ends 72 located into overlying latching engagement with the mounting or clamping rim 56 on the base of the basket 54. The mounting plate 68 has a depending shaft 73 secured within a suitable support assembly, not shown, to provide preselected rotation of the basket about the axis of the core 54 and reciprocation relative to the forming head or core which is fixedly mounted within the supporting plate in any suitable manner.

Figure 22:
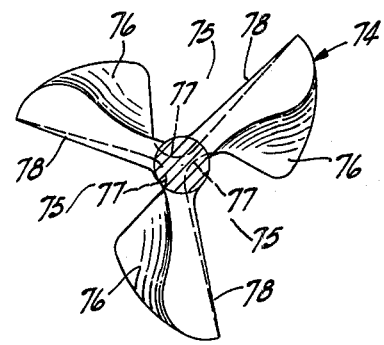
FIG. 22 is a top view of FIG. 21.
Figure 23:
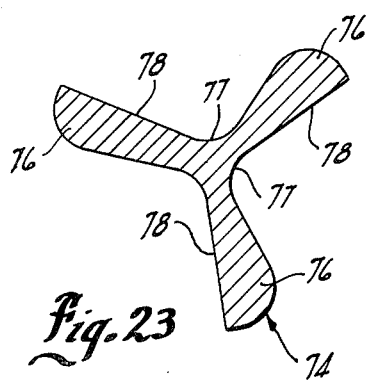
FIGS. 23 – 26 are sectional views through FIG. 21.
Figure 24:
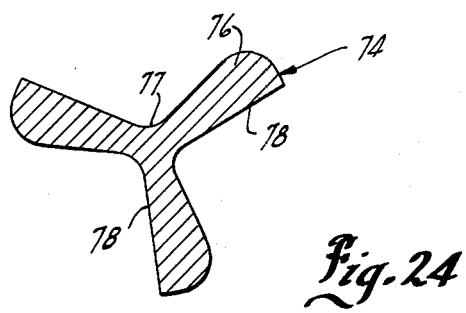
Figure 25:
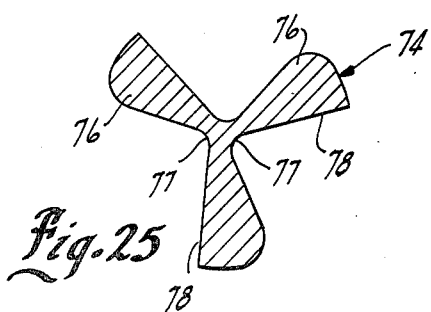
Figure 26:
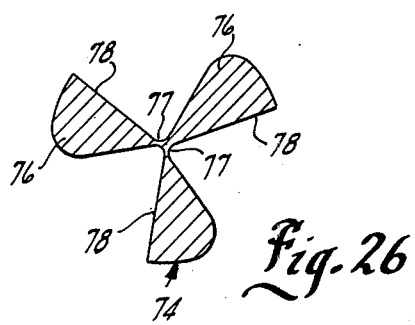

A further embodiment wherein the forming basket is held stationary and the core is rotated with the shredded potatoes fed downwardly through the rotating core as illustrated in FIGS. 21 and 22 and is thus similar to that disclosed in the first embodiment.

When employing a rotating core 74, as shown in FIGS. 21–22, a plurality of feeding and forming grooves 75 are provided. Each groove is similarly constructed and each includes an inclined shaping wall 76 generally constructed in accordance with the previous construction. The varying shape of the practical core is shown in FIGS. 23–26. Applicant has found that where a plurality of large grooves are employed a cut-out portion 77 at the bottom center, which minimizes the spacing therebetween and with at least one extending essentially to the center as shown at the interconnection of the several lower portions of the forming grooves 75, is desirable. This appears to be desirable to insure adequate filling of the base portion of the basket to a uniform thickness including the center portion.

As in the previous embodiment, the configuration of the forming head as well as the rotational speed and feeding rate of the head combine to directly and significantly control the shape and density of the final shell. Thus, the compound wall structure, as in the previous embodiments, services to simultaneously properly feed or distribute the shredded potatoes throughout the basket shell as well as providing slightly compaction but without mashing thereof to provide predetermined densities. The trailing, flat wall 78, as in the previous embodiment, smooths the inner base portion of the shell.

Although shown employing a solid metal head or core, any other structure such as a sheet metal, molded rubber or plastic or the like, could, of course, be provided with the forming surfaces and moving or direction grooves. The present invention thus provides a means for producing relatively delicate edible food shells from potatoes and the like rapidly and at a minimum cost with an improved final product. The shells are repeatably formed of essentially the same size and texture with a minimum amount of labor and particularly skilled labor. The shells are also formed rapidly with a minimum breakdown of the cooking oil which further promotes efficient, low cost production.

Various modes of carrying out the invention are contemplated as being within the scope of the following claims, particularly pointing out and distinctly claiming the subject matter which is regarded as the invention.

I claim:

1. A shaping head apparatus for mounting within a basket to form an edible cup-shaped food product from a particulate food material, comprising a generally frustoconically shaped body portion having an axis and having a base wall and side wall including portions essentially coresponding to the inner shape of the food product, said side wall having at least one peripheral groove means extending axially and circumferentially along the side wall and base wall, said groove means having a material distributing and forming wall extending inwardly from the side wall and circumferentially of the body portion, and wherein said groove includes a lower end having a circumferentially largest dimension and a generally shallow cross-section with a relatively sharp trailing wall, said groove progressively changing to a generally U-shaped groove at the upper end.

2. A shaping head apparatus for mounting within a basket to form an edible cup-shaped food product from a particulate food material, comprising a generally frustoconically shaped body portion having an axis and having a base wall and side wall including portions essentially corresponding to the inner shape of the food product, said side wall having at least one peripheral groove means extending axially and circumferentially along the side wall and base wall, said groove means having a material distributing and forming wall extending inwardly from the side wall and circumferentially of the body portion, and wherein said grooves include four equicircumferentially grooves having the lower end of a first pair of oppositely located grooves joined to the lower end of the second pair of grooves in spaced relation to the bottom wall at the lower portions of the side wall.

3. The shaping head apparatus of claim 2 wherein said grooves means includes a single groove having a relatively large circumferential top opening and narrow bottom opening, the forming wall being circumferentially inclined in the direction of relative rotation and having a reverse incline portion immediately adjacent the base wall.

4. The shaping head apparatus of claim 3 wherein said groove means has a trailing wall portion including a generally vertical wall portion with a reverse incline portion generally aligned with the reverse incline portion of the forming wall.

5. A shaping head apparatus for mounting within a basket to form an edible cup-shaped food product from a particulate food material, comprising a generally frustoconically shaped body portion having an axis and having a base wall and side wall including portions essentially corresponding to the inner shape of the food product, said side wall having a plurality of circumferentially spaced and essentially spiral grooves extending axially and circumferentially along the side wall and base wall, each of said grooves having a leading wall and and a material distributing and forming trailing wall extending inwardly from the side wall and circumferentially of the body portion, said grooves having a progressively decreasing peripheral opening and cross-section from the base wall to the top wall of the body portion, said trailing wall extending circumferentially away from the leading wall and defining with the leading wall a progressively decreasing opening and cross-section from the base wall to the top wall of the body portion.

6. The shaping head appratus of claim 5 wherein the bottom groove means of said base wall includes a generally trailing radial wall portion to define the inner bottom surface of the shell as a generally flat planar surface, and a shallow dished portion extended forwardly from said trailing radial wall portion of said base wall groove means.

* * * * *